United States Patent Office 3,334,098
Patented Aug. 1, 1967

3,334,098
1-MONOCARBOCYCLIC ARYL-3-AMINO-ALKANOYL-2-IMIDAZOLIDINONES
William Blythe Wright, Jr., Woodcliff Lake, N.J., assignor to American Cyanamid Company, Stamford, Conn., a corporation of Maine
No Drawing. Filed May 7, 1964, Ser. No. 365,789
9 Claims. (Cl. 260—247.2)

ABSTRACT OF THE DISCLOSURE

The compounds are 1-monocarbocyclic aryl-3-amino-alkanoyl-2-imidazolidinones useful as herbicides.

The compounds of this invention may be described by the formula:

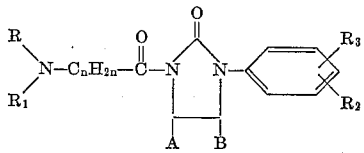

wherein A and B are members of the group consisting of hydrogen and lower alkyl; R and $R_1$ are members of the group consisting of hydrogen, lower alkyl, lower alkenyl, propargyl, cycloalkyl and lower aralkyl;

is a member of the group consisting of piperidino, lower alkylpiperidino, morpholino, lower alkylmorpholino, pyrrolidinyl, lower alkylpyrrolidinyl, hexamethyleneimino, lower alkylpiperazinyl and phenylpiperazinyl; $R_2$ and $R_3$ are members of the group consisting of hydrogen, lower alkyl, halogen, trifluoromethyl, and lower alkoxy; $n$ is an integer from 1 to 3 and the acid addition salts of the above compounds.

The compounds of this invention may be either solids or liquids at room temperature and are relatively insoluble in water but soluble in most organic solvents such as, for example, alcohols, ethers, esters, ketones, chloroform, and the like. The present compounds form acid addition salts such as the hydrochloride, phosphate, citrate, tartrate, maleate, fumarate, etc. which are generally soluble in water, ethanol, and methanol, but relatively insoluble in non-polar solvents such as diloweralkyl ethers, and hydrocarbons.

The compounds of this invention are preferably prepared by reacting a 1-aryl-2-imidazolidinone with a halogenated or arylsulfonyloxy acyl halide and then with an amine.

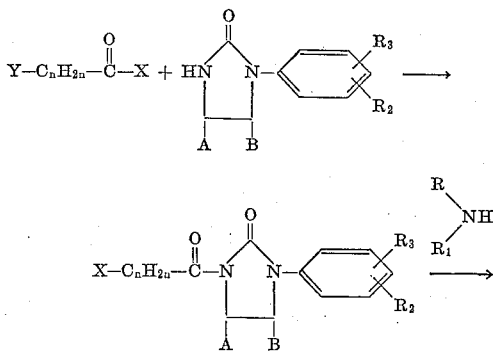

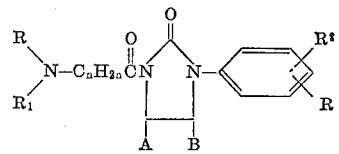

wherein A, B, R, $R_1$, $R_2$, $R_3$ and $n$ are as defined hereinbefore and X is halogen and Y is halogen or arylsulfonyloxy.

The reaction may be carried out in an inert solvent such as benzene, toluene, chloroform, ethyl methyl ketone, ethyl acetate and the like at a temperature range of about $-10°$ C. to $100°$ C. and over a period of time ranging from about one-half hour to more than eight hours. The intermediate halogenated acylimidazolidinone may be first isolated or reacted directly with the amine without isolation. The final product can be isolated and characterized as the basic acylimidazolidinone or converted to a suitable salt. The 1-aryl-2-imidazolidinone intermediates are easily obtained by standard literature procedures.

A further procedure for the preparation of the present compounds is to react a 1-aryl-2-imidazolidinone with a basic acyl halide.

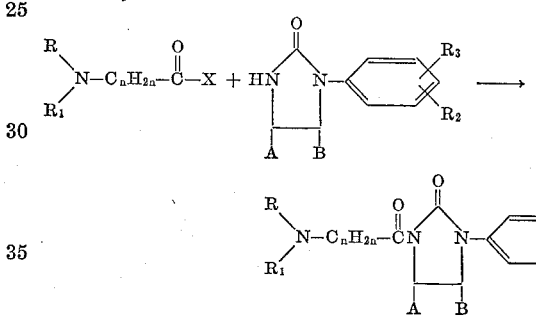

wherein A, B, R, $R_1$, $R_2$, $R_3$, $n$ and X are as defined above. The reaction conditions are similar to those described for the first procedure.

The compounds of this invention have herbicidal activity. This activity may be demonstrated by the following evaluation procedure. The agar technique of herbicide evaluation consists of placing seeds of test plants on water agar (1.5%) into which a chemical has been incorporated (initial concentration, 500 p.p.m.) and over a three-week period observing effects on seed germination, root growth and shoot growth.

The test species are:

(1) Monocots—
  (a) Wheat (var. Genessee)
  (b) Sweet corn (var. Golden Cross Bantam)
(2) Dicots—
  (a) Radish (var. Early Scarlet Globe)
  (b) Cucumber (var. Marketer)

Ten. ml. of each stock solution and/or suspension (100 mg. solid or 0.1 ml. of liquid chemical in 1 ml. of acetone to which is added 99 ml. of deionized water) is placed into each of four wide-mouth 2-oz. bottles with a 10 ml. syringe-pipette and then 10 ml. of 3.0% Difco-Bacto agar is placed into each bottle with a Filamatic Automatic Pipettor. The chemical-agar mixture gels and forms a medium uniformly impregnated with chemical at 500 p.p.m. Two seeds of corn and three each of wheat, radish and cucumber are placed on the surface, one species per bottle. Care is taken to place the corn seed embryos down, to facilitate germination. Seeds of each species placed on 1.5% water agar serve as the control series. Two ml. of water is added to each bottle to help provide optimum conditions for germination. The bottles are covered for 48 hours with glass plates to minimize the escape of volatile chemicals and with brown kraft paper to facilitate germination.

The seeds and plants are observed periodically following treatment and water is added as required. Results are noted after one week and chemicals that kill the seeds or plants of two or more test species are reevaluated at 100 and 10 p.p.m. using the same stock solution and the same procedures. Final data are recorded three weeks after initial exposure to the chemicals. All plant responses such as suppressed growth, elongated stems or leaves, leaf or root malformation and chlorosis as well as the more obvious symptoms of toxicity are recorded. Any chemical that kills two or more species or one that causes unusual responses is advanced to the initial postemergence and preemergence applied herbicide program.

The herbicidal activity of representative examples of compounds of this invention is illustrated in Table I.

TABLE I.—PHYTOTOXICITY

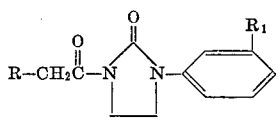

| Compound | | Activity (p.p.m.) | | | |
| --- | --- | --- | --- | --- | --- |
| R | R¹ | Wheat | Radish | Cucumber | Corn |
| Methylamino | H | 500 | | 500 | |
| Piperidino | H | 500 | 500 | | |
| Pyrrolidinyl | m-Cl | 500 | 500 | 500 | 500 |
| Morpholino | m-Cl | 100 | 100 | 100 | 100 |
| Piperidino | A-Cl | 100 | 100 | 100 | 100 |

The compounds of the invention are formulated by admixture with a carrier material or conditioning agent, in the form of solutions, dusts, water dispersible powder, aqueous dispersions and emulsions, in order to utilize the herbicidal activity to best advantage. These formulations are suitable for efficient application to soil, weeds or unwanted plants using conventional applicator equipment.

The following examples describe in detail the preparation of representative 1-acyl-2-imidazolidinones of the present invention.

EXAMPLE 1

*Preparation of 1-(m-chlorophenyl)-3-piperidinoacetyl-2-imidazolidinone hydrochloride*

A mixture of 78 parts of 1-(m-chlorophenyl)-2-imidazolidinone and 800 parts of benzene is cooled in an ice bath and 39 parts by volume of bromoacetyl bromide is added dropwise with stirring. The mixture is stirred for 30 minutes, heated at reflux temperature for 1 hour and cooled. The precipitate is filtered off and recrystallized from benzene. The 1-bromoacetyl-3-(m-chlorophenyl)-2-imidazolidinone melts at 157°–159° C.

A mixture of 32 parts of 1-bromoacetyl-3-(m-chlorophenyl)-2-imidazolidinone, 20 parts by volume of piperidine and 500 parts by volume of benzene is allowed to stand for 18 hours. The precipitate is filtered off and discarded. The mother liquor is concentrated to a crystalline residue and recrystallized from ethanol. The 1-(m-chlorophenyl)-3-piperidinoacetyl-2-imidazolidinone, melting point 112°–114° C., is dissolved in ethanol and ethanolic hydrogen chloride is added. The hydrochloride salt is filtered off and melts at 263°–265° C.

EXAMPLE 2

*Preparation of 1-(m-chlorophenyl)-3-propargylmethylaminoacetyl-2-imidazolidinone*

The above compound is obtained when 1-bromoacetyl-3-(m-chlorophenyl)-2-imidazolidinone is reacted with propargylmethylamine by the procedure described in Example 1.

EXAMPLE 3

*Preparation of 1-(m-chlorophenyl)-3-cyclopropylethylaminoacetyl-2-imidazolidinone*

The above compound is obtained when cyclopropylethylamine is substituted for piperidine in the procedure of Example 1.

EXAMPLE 4

*Preparation of 1-allylmethylaminoacetyl-3-(m-chlorophenyl)-2-imidazolidinone*

The above compound is obtained when allylmethylamine is reacted with 1-bromoacetyl-3-(m-chlorophenyl)-2-imidazolidinone by the procedure of Example 1.

EXAMPLE 5

*Preparation of 1-(3,5-dichlorophenyl)-3-piperidinoacetyl-2-imidazolidinone hydrochloride*

The above compound, melting point 247°–250° C., is obtained when 1-(3,5-dichlorophenyl)-2-imidazolidinone is substituted for 1-(m-chlorophenyl)-2-imidazolidinone in the procedure of Example 1.

EXAMPLE 6

*Preparation of 1-(3,4-dichlorophenyl)-3-piperidinoacetyl-2-imidazolidine hydrochloride*

The above compound, melting point 249°–251° C., is obtained by the procedure of Example 1 when 1-(3,4-dichlorophenyl)-2-imidazolidinone is substituted for 1-(m-chlorophenyl)-2-imidazolidinone.

EXAMPLE 7

*Preparation of 1-(3-chloro-p-tolyl)-3-piperidinoacetyl-2-imidazolidinone hydrochloride*

When 1-(3-chloro-p-tolyl)-2-imidazolidinone is substituted for 1-(m-chlorophenyl)-2-imidazolidinone in the procedure of Example 1, the above compound, melting point 243°–245° C., is obtained.

EXAMPLE 8

*Preparation of 1-(m-chlorophenyl)-3-pyrrolidinylacetyl-2-imidazolidinone hydrochloride*

The above compound, melting point 257°–259° C. is obtained when pyrrolidine is substituted for piperidine in the procedure of Example 1 and the product worked up in a similar manner.

EXAMPLE 9

*Preparation of 1-(m-chlorophenyl)-3-(2-methylpyrrolidinyl)-acetyl-2-imidazolidinone*

The above compound is obtained when 2-methyl pyrrolidine is substituted for piperidine in the procedure of Example 1.

EXAMPLE 10

*Preparation of 1-(m-chlorophenyl)-3-morpholinoacetyl-2-imidazolidinone hydrochloride*

Using the procedure of Example 1 and substituting morpholine for piperidine the above compound is obtained, melting point 253° C. dec.

EXAMPLE 11

*Preparation of 1-(m-chlorophenyl)-3-(2-methylmorpholino)-acetyl-2-imidazolidinone*

The above compound is obtained when 2-methyl morpholine is substituted for piperidine in the procedure of Example 1.

EXAMPLE 12

*Preparation of 1-(m-chlorophenyl)-3-(2-methylpiperidino)-acetyl-2-imidazolidinone*

The above compound is obtained when 2-methyl piperidine is substituted for piperidine in the procedure of Example 1.

EXAMPLE 13

*Preparation of 1-(m-chlorophenyl)-3-(hexamethyleneimino)-acetyl-2-imidazolidinone*

When hexamethyleneimine is substituted for piperidine in the procedure of Example 1, the above compound is obtained.

EXAMPLE 14

*Preparation of 1-(m-chlorophenyl)-3-(4-methyl-1-piperazinyl)-acetyl-2-imidazolidinone*

The above compound, melting point 125°–127° C. is obtained when 4-methylpiperazine is substituted for piperidine in the procedure of Example 1.

EXAMPLE 15

*Preparation of 1-benzylmethylaminoacetyl-3-(m-chlorophenyl)-2-imidazolidinone*

The above compound, melting point 130°–132° C., is obtained when benzylmethylamine is substituted for piperidine in the procedure of Example 1. The hydrochloride melts at 208°–210° C.

EXAMPLE 16

*Preparation of 1-(p-bromophenyl)-3-(4-phenyl-1-piperazinyl)-acetyl-2-imidazolidinone*

The above compound is obtained when 1-(p-bromophenyl)-2-imidazolidinone is substituted for the 1-(m-chlorophenyl)-2-imidazolidinone and 4-phenylpiperazine is substituted for the piperidine in the procedure of Example 1.

EXAMPLE 17

*Preparation of 1-(m-fluorophenyl)-4-methyl-3-(2-piperidinopropionyl)-2-imidazolidinone*

A mixture of 19 parts of 1-(m-fluorophenyl)-4-methyl-2-imidazolidinone and 200 parts of benzene is cooled in an ice bath and 22 parts of 2-bromopropionyl bromide is added dropwise with stirring. The mixture is heated at reflux temperature for one hour and cooled. Thirty parts of piperidine are added and the mixture is heated at reflux temperature for two hours. The mixture is cooled and the piperidine hydrobromide is filtered off and discarded. The mother liquor is concentrated and the crude 1-(m-fluorophenyl)-4-methyl-3-(2-piperidinopropionyl)-2-imidazolidinone is further purified by partition chromatography on diatomaceous earth.

EXAMPLE 18

*Preparation of 1-(m-methoxyphenyl)-5-methyl-3-piperidinoacetyl-2-imidazolidinone*

A mixture of 9 parts of 1-(m-methoxyphenyl)-5-methyl-2-imidazolidinone and 100 parts of benzene is cooled in an ice bath and 10 parts of bromoacetylbromide are added dropwise with stirring. The mixture is heated at room temperature for one hour and cooled. Fifteen parts of piperidine are added and the mixture is heated at reflux temperature for two hours. The piperidine hydrobromide is filtered off and the mother liquor is concentrated to remove the solvent. The crude 1-(m-methoxyphenyl) - 5 - methyl-3-piperidinoacetyl-2-imidazolidinone is further purified by partition chromatography on diatomaceous earth.

EXAMPLE 19

*Preparation of 1-(m-trifluoromethylphenyl)-3-(4-piperidinobutyryl)-2-imidazolidinone*

A mixture of 12 parts of 1-(m-trifluoromethylphenyl)-2-imidazolidinone and 300 parts of benzene is cooled to 10° C., 9.5 parts of 4-piperidinobutyryl chloride are added and the reaction mixture is heated at reflux temperature for two hours. One hundred parts of 1N sodium hydroxide are added and the mixture is stirred. The aqueous layer is separated and the organic portion is washed with water and concentrated to remove solvent. The 1-(m-trifluoromethylphenyl) - 3 - (4 - piperidinobutyryl)-2-imidazolidinone is further purified by chromatography.

EXAMPLE 20

*Preparation of 1-methylaminoacetyl-3-phenyl-2-imidazolidinone hydrochloride*

A mixture of 2.8 parts of 1-benzylmethylaminoacetyl-3-(m-chlorophenyl)-2-imidazolidinone, 1 part of 10% palladium on carbon catalyst and 100 parts of 90% ethanol is reduced in a Parr hydrogenator until hydrogen uptake is complete. Water is added to dissolve the precipitated product and the catalyst is filtered off. The filtrate is concentrated and the crystalline residue is recrystallized from 85% ethanol. 1-methylaminoacetyl-3-phenyl-2-imidazolidinone hydrochloride decomposes at 269° C.

EXAMPLE 21

*Preparation of 1-phenyl-3-piperidinoacetyl-2-imidazolidinone hydrochloride*

When 1-(m-chlorophenyl)-3-piperidinoacetyl-2-imidazolidinone hydrochloride is reduced by the procedure of Example 20, the above compound, melting point 242°–245° C., is obtained.

I claim:
1. A compound of the formula:

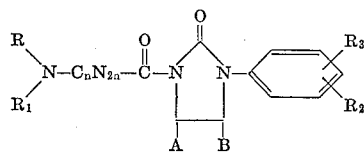

wherein A and B are members of the group consisting of hydrogen and lower alkyl; R and $R_1$ are members of the group consisting of hydrogen, lower alkyl, lower alkenyl, propargyl, cyclopropyl and benzyl;

is a member of the group consisting of piperidino, lower alkylpiperidino, morpholino, lower alkylmorpholino, pyrrolidino, lower alkylpyrrolidino, hexamethyleneimino, lower alkylpiperazino and phenylpiperazino; $R_2$ and $R_3$ are members of the group consisting of hydrogen, lower alkyl, halogen, trifluoromethyl, and lower alkoxy; $n$ is an integer from 1 to 3; or the acid addition salts thereof.

2. The compound 1 - (m-chlorophenyl)-3-piperidinoacetyl-2-imidazolidinone.

3. The compound 1-(m-chlorophenyl)-3-pyrrolidinoacetyl-2-imidazolidinone.

4. The compound 1-(m-chlorophenyl)-3-morpholinoacetyl-2-imidazolidinone.

5. The compound 1-(m-chlorophenyl)-3-(4-methyl-1-piperazinyl)-acetyl-2-imidazolidinone.

6. The compound 1-benzylmethylaminoacetyl-3-(m-chlorophenyl)-2-imidazolidinone.

7. The compound 1-methylaminoacetyl-3-phenyl-2-imidazolidinone.

8. The compound 1-phenyl-3-piperidinoacetyl-2-imidazolidinone.

9. The compound 1-(3,5-dichlorophenyl)-3-piperidinoacetyl-2-imidazolidinone.

References Cited

UNITED STATES PATENTS

| 3,134,785 | 5/1964 | Schoenauer et al. | 260—309.7 |
| 3,193,559 | 7/1965 | Regnier et al. | 260—247.2 |
| 3,196,152 | 7/1965 | Wright et al. | 260—309.7 |

ALEX MAZEL, *Primary Examiner.*

JOSE TOVAR, *Assistant Examiner.*